No. 748,050. PATENTED DEC. 29, 1903.
W. CROSLEY.
SLIDE RULE AND CALCULATOR.
APPLICATION FILED FEB. 6, 1903.
NO MODEL. 2 SHEETS—SHEET 1.

WITNESSES. INVENTOR:
Fred White William Crosley,
Thomas Wallace By his Attorneys No. 748,050.

Patented December 29, 1903.

UNITED STATES PATENT OFFICE.

WILLIAM CROSLEY, OF BULAWAYO, SOUTH AFRICA.

SLIDE-RULE AND CALCULATOR.

SPECIFICATION forming part of Letters Patent No. 748,050, dated December 29, 1903.

Application filed February 6, 1903. Serial No. 142,118. (No model.)

*To all whom it may concern:*

Be it known that I, WILLIAM CROSLEY, mining engineer, of Bulawayo, in the Territory of Southern Rhodesia, South Africa, (post-office box 400,) have invented certain new and useful Improvements in Calculators, of which the following is a specification.

This invention relates to calculating machines or apparatus, and has for its object to provide a simple and accurate means whereby multiplication and division may be rapidly performed, and more especially for ascertaining at a glance the value of the $\frac{m}{nth}$-part of any number where $m$ and $n$ have any given values.

A calculating device made in accordance with my invention comprises a cone adapted to be rotated on its axis, an edge line or wire disposed in or parallel to a line drawn from the apex to the base of the said cone, a part of the surface of the said cone being engraved, covered, or marked with lines, which if developed on the flat would be a triangular surface covered with lines parallel to two sides thereof.

Figure 1:
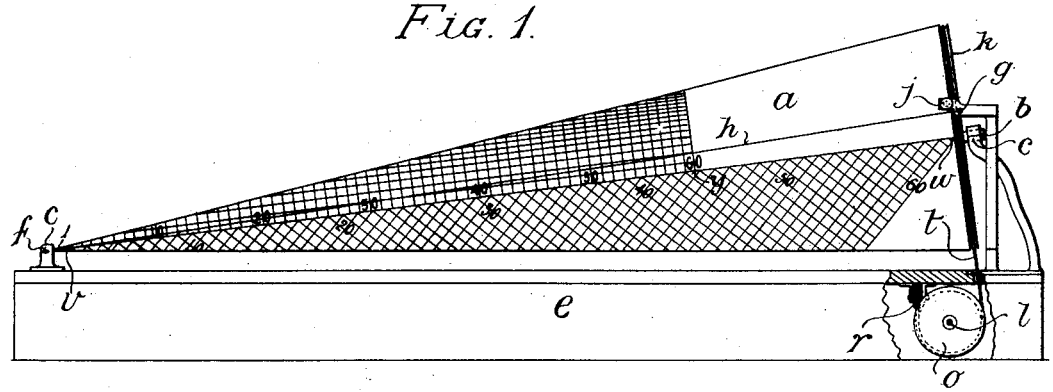
Figure 2:
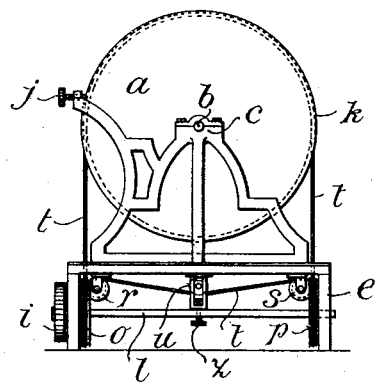
Figure 3:
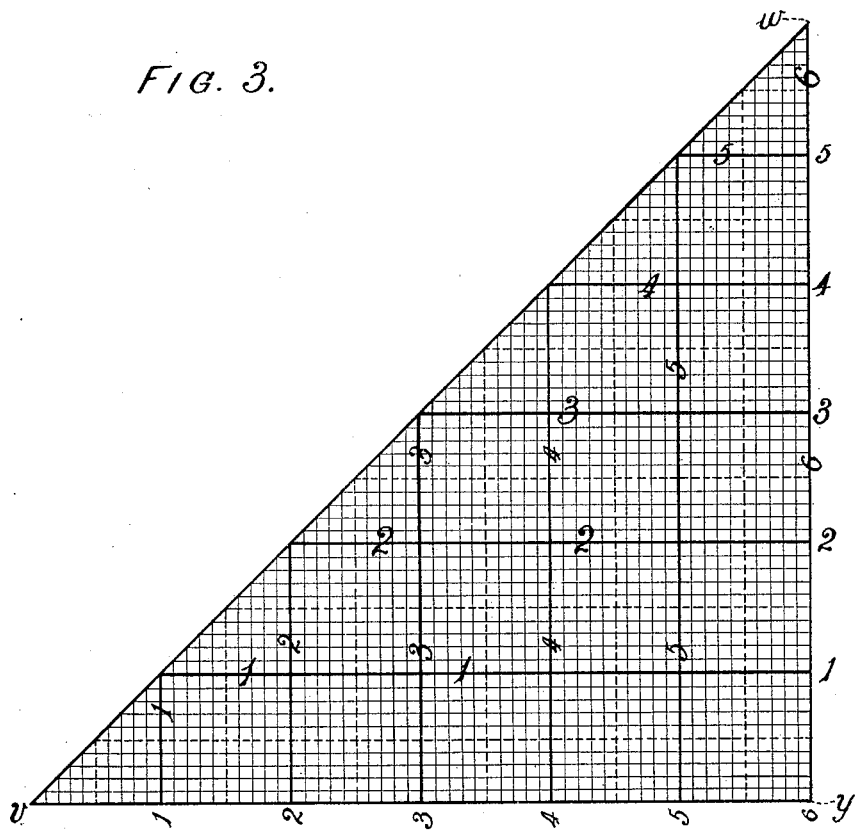

Referring now to the drawings, Figure 1 is an elevation of a calculating device made in accordance with my invention, and Fig. 2 is an end elevation. Fig. 3 is a diagram showing in plane development one method of marking and dividing the cone.

A cone $a$, of brass or any other suitable material, is mounted upon a spindle $b$, passing through the axis thereof. The spindle is placed in bearings $c$ and so disposed on a stand $e$ that the under side of the cone is horizontal or parallel to the surface of the said stand, or instead of a spindle passing through the cone the apex of the cone may be of hard metal, such as gun-metal or steel, to take the place thereof at one end, in which case the point of the cone would take its bearing in a suitable cup or pivot step fixed to the stand to receive it. To supports $f$ and $g$ on the stand, disposed at or near the apex and base of the cone, is attached a wire $h$ or band adapted to be held as close as possible to the surface of the cone without scraping it. The said wire or band is or may be attached to a tightening device to take up the expansion and allow for the contraction in the wire due to alterations in temperature. Suitably disposed near the surface of the cone and mounted on the stand is a small milled headed screw $j$, with a rubber or leather tip adapted to be advanced or withdrawn, so as to put just sufficient friction on the cone to cause it to rest in any desired position in which it may be placed. This is important in case there be the least imperfection in the balance of the cone creating a tendency for it to move even the slightest amount from the position in which it is set. Upon the base of the cone and disposed centrally therewith is mounted a grooved pulley $k$. On the stand suitable brackets and bearings are disposed carrying a spindle $l$, having a milled head $i$ and fast and loose pulleys $o$ and $p$. Two other pulleys $r$ and $s$ on separate spindles and carried by suitable bearings and brackets attached to the stand are mounted tangentially to the said fast and loose pulleys $o$ and $p$. A belt or band of cord or catgut $t$ is passed over the fast and loose pulleys $r$ and $s$, the pulleys $o$ and $p$ tangential thereto, and the pulley $k$ at the base of the cone. In some cases I may provide a pulley $u$, adapted to bear upon and tighten the belt $t$, said pulley being adjustable by a screw device, such as $z$, and I may also employ a clamp and tangent-screw for rotating the cone.

The dimensions of the cone are selected to suit the calculations required, but in the device now being described the angle at the apex inclosed by the edges of the surface of the cone when developed on the flat is forty-five degrees.

Upon the cone is engraved or marked a straight line $v\,w$ from the apex to the base. A portion of this line, $v\,y$, commencing from the apex is divided into any chosen number of spaces of any convenient length. These spaces are preferably subdivided into tenths. At the end of these markings or divisions $y$ and at right angles to this line $v\,y$ another line $y\,w$ is drawn exactly equal to the divided portion $v\,y$ of the first-named line and similarly divided. This line forms a spiral of one complete turn round the cone and ends at $w$ on the first-named line. From each point and each subdivision of these lines other lines are drawn parallel to the two lines $v\,y$ and $y\,w$, above referred to. The vertical lines are or may be numbered from the apex "1" to "n," where "n" is any number, at frequent intervals and preferably figured in red ink and the lines which were drawn parallel to the first-named line numbered "1" to "n" at frequent intervals and preferably figured in black ink, No. 1 being that nearest the first-named line. Every fifth line either way is preferably a dotted line, as shown in Fig. 3. If the instrument is intended for general use, the horizontal and vertical lines may be divided into sixty parts, as shown. If intended for use in reducing to a common denominator the value of assays of reefs or seams of different widths, I prefer to divide the first-named or horizontal line into half-inch spaces to read "forty-two inches" and the second-named or vertical line into half-inch spaces to read "forty-two pennyweights." This would allow any sloping width up to three and one-half feet to be used as a divider. A cone thus divided would read in a half-inch square the second place of decimals with all necessary accuracy. Each tenth of a big square is a tenth of a pennyweight one way and a tenth of an inch depth of reef or seam the other way. Any number of inches found upon the line may be used as a divider, provided that the number of pennyweights in the proposition is contained in the vertical lines at the divisor. The scales can be used at a multiplied value by making a corresponding appreciation of the readings.

In use, assuming it has been ascertained in an assay of a reef or seam twenty-five inches wide that there are twenty-seven pennyweights to a ton and it is required to reduce this to a common denominator—say a seam thirty inches in width—the calculation to be made is $\frac{25}{30} \times 27$. The cone is rotated until the wire cuts the point where the horizontal line "27" joins the vertical line "30." Then where the wire covers the vertical line "25" the result "22.5" is read at a glance.

It is of great importance that the cone be always absolutely true, rigid, and perfectly balanced.

In some cases I may dispense with the cone and use a chart constructed in a similar manner to that described, but used on the flat instead of being wrapped on a cone, in which case I preferably use a silk line as an indicating-arm or straight edge pivoted at the corner of the chart. The scope may be somewhat extended by making the lines cover a complete square.

The principle of this apparatus may be employed for any other unit of value and measurement than that selected as an example, it being only necessary to have the chart or cone graduated to other scales or divisions.

What I claim, and desire to secure by Letters Patent, is—

1. In calculators the combination of a cone rotating on its axis, a chart inscribed upon the surface of the cone, a straight edge fixed adjacent to the surface of the cone and parallel thereto, means for rotating the cone on its axis, said chart being inscribed with lines, one passing from the apex to the base, a portion of said line commencing from the apex of the cone being divided into a chosen number of regular spaces, a second line passing spirally round the cone from the point where the divisions of the first line terminate to the base of the cone to meet the end of the first-named line, the said second line being divided into regular spaces, lines being drawn for the divisions on the first-named line parallel to the second line and from the division on the second-named line parallel to the first-named line, substantially as described.

2. In calculators the combination of a cone rotating on its axis, a chart inscribed upon the surface of the cone, a straight edge fixed adjacent to the surface of the cone and parallel thereto, means for rotating the cone on its axis, said cone being inscribed with a chart which when developed on the flat comprises a triangular space having lines parallel to two sides and crossing one another at regular intervals two of the sides of the triangle when on the cone lying in a straight line drawn from the apex to the base the said lines having indicator-numbers.

3. In calculators the combination of a cone rotating on its axis, a chart inscribed upon the surface of the cone, a straight edge fixed adjacent to the surface of the cone and parallel thereto, means for rotating the cone on its axis, said cone being inscribed with a chart which when developed on the flat comprises a right-angled triangle having two equal sides and having lines parallel to the said equal sides which lines cross one another at regular intervals, two of the sides of the triangle when on the cone lying in a straight line drawn from the apex to the base, indicator-numbers being provided for said lines, substantially as described.

4. In calculators wherein a cone is mounted so as to rotate on its axis and is fitted with a straight edge passing from its apex to its base, the means for rotating the cone comprising a grooved pulley on the axis of the cone, a shaft having a fast and loose pulley, an operating-handle for the shaft, guide-pulley between fast and loose pulleys, an endless band passing over all the pulleys, substantially as and for the purpose set forth.

In witness whereof I have hereunto signed my name in the presence of two subscribing witnesses.

WILLIAM CROSLEY.

Witnesses:
JAMES MORRELL,
JOHN LAMB.